(12) United States Patent
Lebeda et al.

(10) Patent No.: US 10,946,974 B2
(45) Date of Patent: Mar. 16, 2021

(54) MONOLITHIC LIPSKIN AND METHOD OF FABRICATION

(71) Applicant: Spirit AeroSystems, Inc., Wichita, KS (US)

(72) Inventors: Dennis Lebeda, Rose Hill, KS (US); Roger Kornfeld, Whitewater, KS (US); Amitabh Vyas, Wichita, KS (US); Scott E. Graves, Wichita, KS (US); Mark Wadsworth, Sedan, KS (US); Aaron Heitmann, Andover, KS (US); Rahbar Nasserrafi, Warren, OH (US); Darrell A Wade, Rose Hill, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 1107 days.

(21) Appl. No.: 15/399,925

(22) Filed: Jan. 6, 2017

(65) Prior Publication Data

US 2018/0127108 A1    May 10, 2018

Related U.S. Application Data (60) Provisional application No. 62/419,221, filed on Nov. 8, 2016.

(51) Int. Cl.
*B64D 33/02* (2006.01)
*F02C 7/04* (2006.01)

(52) U.S. Cl.
CPC ............... *B64D 33/02* (2013.01); *F02C 7/04* (2013.01); *F05D 2230/20* (2013.01); *Y02T 50/60* (2013.01)

(58) Field of Classification Search
CPC ........ B64D 33/02; B64D 29/00; B64D 29/02; B64D 29/06; F02C 7/04; B21D 22/14; B21D 22/16; B21D 22/18
See application file for complete search history.

(56) References Cited

U.S. PATENT DOCUMENTS

| | | | | |
|---|---|---|---|---|
| 9,664,113 | B2* | 5/2017 | Wilson | B64D 33/02 |
| 10,059,423 | B2* | 8/2018 | Smithson | B32B 5/22 |
| 2004/0050908 | A1* | 3/2004 | Kendall | B21D 22/16 |
| | | | | 228/112.1 |
| 2015/0314850 | A1* | 11/2015 | Lumbab | B64D 33/02 |
| | | | | 415/215.1 |
| 2015/0367395 | A1* | 12/2015 | Ludlow | E21B 47/085 |
| | | | | 72/352 |
| 2016/0023771 | A1* | 1/2016 | Riquet | B64D 15/00 |
| | | | | 244/134 E |

(Continued)

*Primary Examiner* — Benjamin P Lee
(74) *Attorney, Agent, or Firm* — Hovey Williams LLP (57) ABSTRACT

An aircraft nacelle and method of fabricating a monolithic lipskin of the nacelle. The nacelle may include a fan cowl, a bulkhead, and the monolithic lipskin. The lipskin may be formed by spin-forming or explosive forming an annularly-shaped plate onto a mandrel, and machining or chemically-milling integrated stiffeners or other protrusions and attachment tabs into an inner mold line (IML) of the lipskin. The machining or chemical milling may occur before or after the spin-forming or explosive forming. The stiffeners may have a spiral or circumferential configuration. An attachment tab extending from the IML may attach to the bulkhead, such that an outer mold like (OML) of the lip-skin is not disrupted by mechanical fasteners attaching the lipskin to the bulkhead.

16 Claims, 9 Drawing Sheets

(56) References Cited

U.S. PATENT DOCUMENTS

| | | | |
|---|---|---|---|
| 2016/0251085 A1* | 9/2016 | Stark | B64D 33/02 244/53 R |
| 2018/0093316 A1* | 4/2018 | Leacock | B21D 25/04 |
| 2018/0339783 A1* | 11/2018 | Leon | B64D 33/02 |
| 2019/0184443 A1* | 6/2019 | Morganti | B21D 22/14 |
| 2020/0206799 A1* | 7/2020 | Stewart, III | B64D 29/00 |

\* cited by examiner

MONOLITHIC LIPSKIN AND METHOD OF FABRICATION

RELATED APPLICATIONS

The present utility patent application claims priority benefit, with regard to all common subject matter, of earlier-filed U.S. provisional patent application titled "Monolithic Lipskin and Method of Fabrication" Ser. No. 62/419,221, filed Nov. 8, 2016, hereby incorporated in its entirety by reference into the present application.

BACKGROUND

Airplane engines are often surrounded by engine nacelles with rounded lipskin structures at their forward ends. To reduce aircraft fuel consumption and increase efficiency, outer lipskin surfaces and outer surfaces of the nacelle (also referred to herein as laminar flow surfaces) are preferably designed to be as aerodynamic as possible. To achieve desirable laminar flow, the outer surfaces must tightly conform to defined contours and maintain a smooth surface, free of protrusions, seams, and waviness. However, various structural components and stiffeners used for structural support are typically attached to the lipskin and nacelle via fasteners and joints, which can interfere with the smoothness of the lipskin and disrupt laminar flow on the outer surface of the lipskin and nacelle. Use of countersunk fasteners minimizes but does not eliminate this problem.

Thus, there is a need for an improved method of stiffening lipskins while reducing undesirable interference with laminar flow.

SUMMARY OF THE INVENTION

Embodiments of the present invention solve the above-mentioned problems and provide a distinct advance in the art of nacelle lipskins and their fabrication.

One embodiment of the invention may include a method of forming a monolithic lipskin for an aircraft nacelle. The method may include the steps of spin-forming or explosive-forming an annular plate of metal onto a mandrel and selectively removing material from an inner mold line (IML) surface, forming protrusions for attachment or structural stiffening of the monolithic lipskin. The annular plate to be spin-formed or explosive-formed may have inner and outer edges, the IML surface, and an outer mold line (OML) surface opposite the IML surface. The spin-forming or explosive-forming deforms the annular plate into an annular three-dimensionally curved surface having an apex between the inner and outer edges.

In yet another embodiment of the invention, a method of forming an aircraft nacelle with a monolithic lipskin may include a step of spin-forming an annular plate of metal onto a spinning mandrel. The annular plate may have inner and outer edges, an IML surface, and an OML surface opposite the IML surface. The spin-forming deforms the annular plate into an annular three-dimensionally curved surface having an apex between the inner and outer edges. Next, the method may include a step of machining or chemically milling the IML surface into protrusions for attachment or structural stiffening of the monolithic lipskin. The protrusions may include stiffeners and an attachment flange. The stiffeners have a circular or a spiral configuration and are sized and oriented in accordance with a finite element analysis model of the aircraft nacelle. The method may also include the steps of mechanically attaching a bulkhead to the attachment flange proximate an outer edge of the bulkhead, and mechanically attaching a flange of the bulkhead to the monolithic lipskin at the inner edge of the annular plate. The flange may be located at an inner edge of the bulkhead, opposite the outer edge of the bulk head. The method may also include a step of mechanically attaching the flange of the bulkhead to a fan cowl having a front edge abutting the inner edge of the annular plate.

Another embodiment of the invention is an aircraft nacelle comprising an engine cowl, a bulkhead, and a monolithic lipskin. The bulkhead has a first portion and a second portion extending at an angle from the first portion. The monolithic lipskin has an IML surface, an OML surface opposite the IML surface, an outer edge, and an inner edge opposite the outer edge. The monolithic lipskin further has an annular shape that is three-dimensionally curved, having an apex between the inner edge and the outer edge, an inner wall between the apex and the inner edge, and an outer wall between the apex and the outer edge. The second portion of the bulkhead is mechanically attached to the inner wall of the monolithic lipskin and to the fan cowl. A distance along the OML surface along the outer wall between the apex and the outer edge is in a range of 15 percent to 25 percent a total length of the aircraft nacelle. The IML surface has a plurality of protrusions extending therefrom, including circular or spiral stiffeners spaced apart in a forward-to-aft direction along the monolithic lipskin IML, an attachment flange extending from the IML on the outer wall in a direction toward the inner wall and having holes formed therethrough for mechanically attaching to the first portion of the bulkhead, and heat transfer fins and/or vortex generators machined into the IML surface forward of the stiffeners and proximate to the apex.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
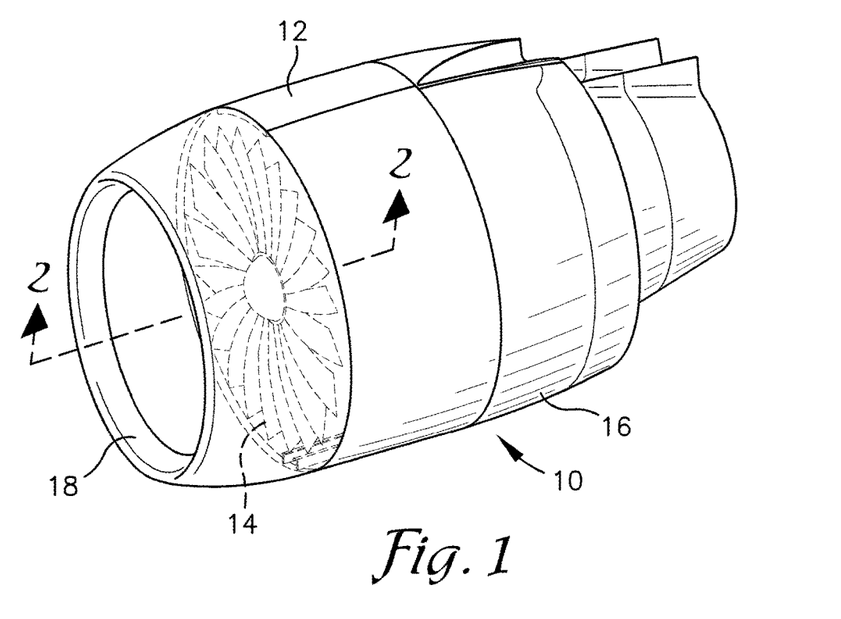
FIG. 1 is a front perspective view of an aircraft nacelle constructed according to embodiments of the present invention.
Figure 2:
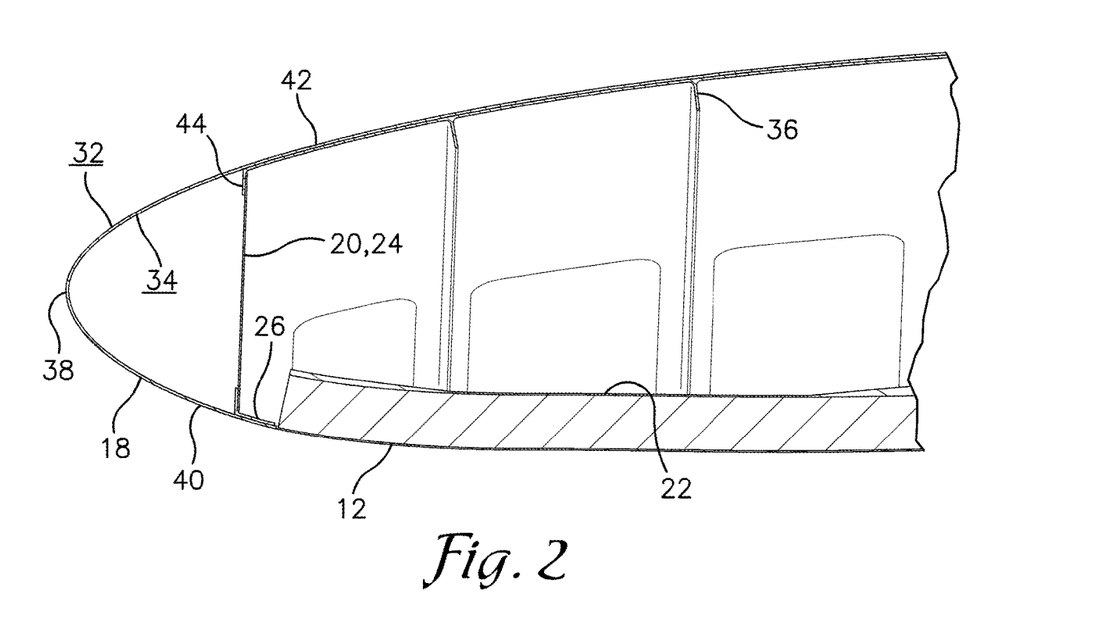
FIG. 2 is a fragmentary side cross-sectional view of a lipskin, bulkhead, and fan cowl of the nacelle taken along line 2-2 of FIG. 1.

An aircraft nacelle 10 constructed in accordance with embodiments of the present invention is illustrated in FIG. 1. The nacelle 10 may include a fan cowl 12 surrounding an aircraft engine fan 14, a thrust reverser 16, and a lipskin 18. The lipskin 18 may be monolithically-formed according to a method later described herein. A bulkhead 20, as illustrated in FIG. 2, may attach the lipskin 18 to the fan cowl 12.

The fan cowl 12 may be a substantially annular structure substantially surrounding an aircraft engine and/or the aircraft engine fan 14. The fan cowl 12 may include a forward end, an aft end, an inner cowl wall and an outer cowl wall made of a rigid material such as metal, aluminum, or composite material. In some embodiments of the invention, an acoustic core, such as a honeycomb core 22, may be attached to or integrally-formed with the inner cowl wall. The thrust reverser 16 may be attached to the aft end of the fan cowl 12 and may include a cascade thrust reverser with a translating cowl or any thrust reverser known in the art.

The bulkhead 20 may be an annular or ring-shaped structural component, formed by mechanical attachment of various segments of a rigid material (such as an upper half bulkhead and a lower half bulkhead) or formed as a single annular monolithic bulkhead. In some embodiments of the invention, the bulkhead 20 may include a first portion 24 spanning a distance within the lipskin 18, and a second portion 26 also referred to herein as a bulkhead attachment flange extending aftward from the first portion 24 of the bulkhead 20 and configured for attachment to both the lipskin 18 and the inner cowl wall of the fan cowl 12, as illustrated in FIG. 2. The first and second portions 24,26 of the bulkhead 20 may be angled relative to each other at a 90-degree angle, a less-than-90-degree angle, or a greater-than-90-degree angle without departing from the scope of the invention.

Figure 3:
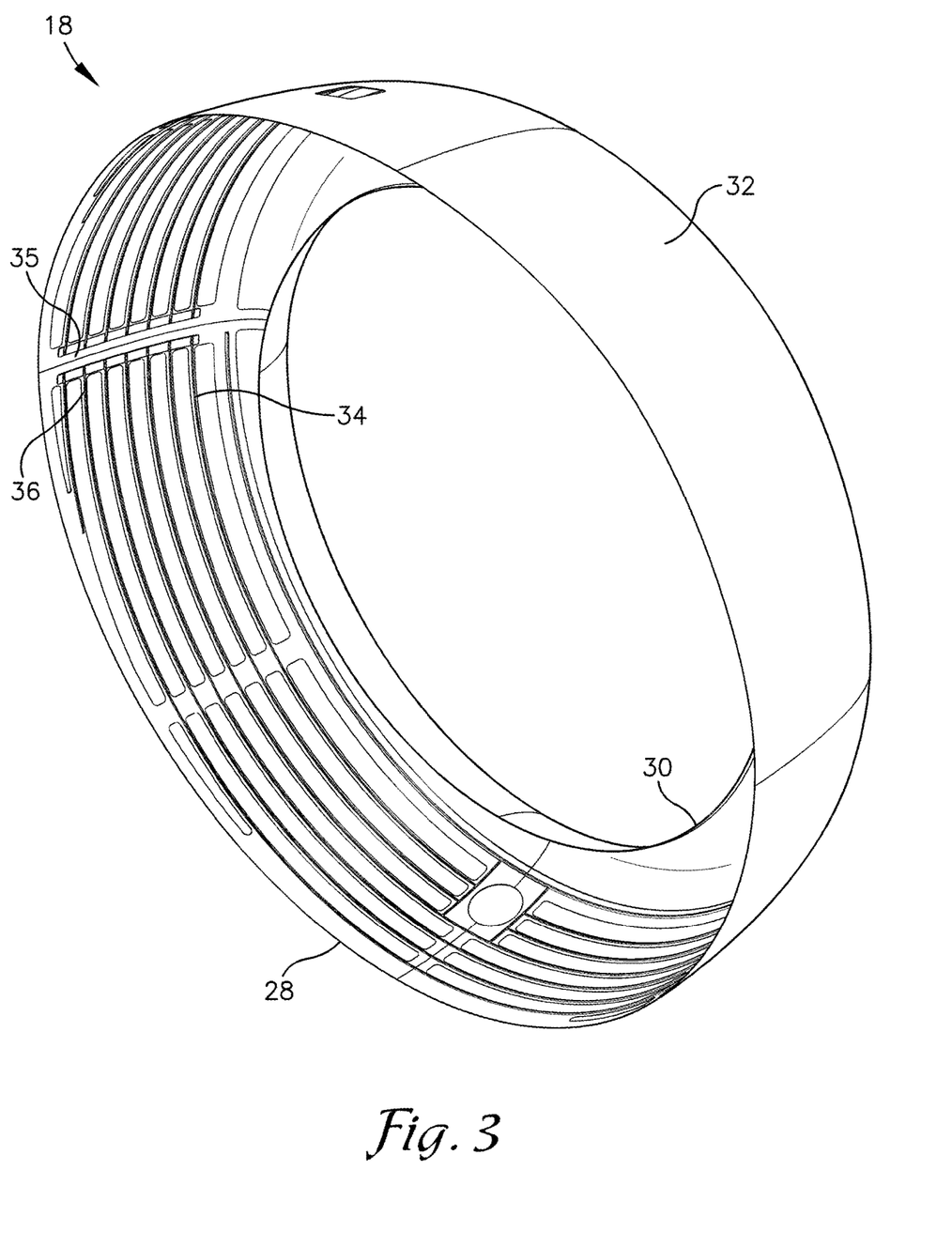
FIG. 3 is a rear perspective view of the lipskin of FIG. 2.

As illustrated in FIG. 3, the lipskin 18 may be formed of a metal, such as a thick annular plate of aluminum having an outer edge 28 and an inner edge 30. The lipskin may be made as a single, 360-degree part including an outer surface, alternatively referred to herein as an outer mold line (OML) 32 or laminar flow surface, and an inner surface, alternatively referred to herein as an inner mold line (IML) 34, as well as a one or more stiffeners 36 integrally formed in the IML 34. That is, the OML 32 may be machined with a smooth surface as defined by a laminar flow analysis and design for given aircraft requirements. The IML 34 may be machined with the stiffeners 36, lands, pockets, and/or other integral features so as to be weight and stiffness optimized and to reduce how many fasteners are required for assembly. Lands, as described herein, may be slightly thicker or slightly protruding portions of the IML 34 that are not as thick as the stiffeners 36. Pockets, as described herein, may be cavities formed into the IML 34. Note that the continuity of the spiral-shaped or circumferentially-shaped stiffeners may be interrupted by various lands 35, pockets, or other machined features without departing from the scope of the invention, as illustrated in FIG. 3. The stiffeners 36 may be sized, shaped, spaced, and oriented in accordance with a finite element analysis model of the aircraft nacelle 10.

As illustrated in FIG. 2, the lipskin 18 may have an apex 38, an inner wall 40 below and aftward of the apex 38, and an outer wall 42 above and aftward of the apex 38. The apex 38 may also alternatively be referred to as the "highlight" of the lipskin 18. In some embodiments of the invention, the lipskin's outer wall 42 may be extended aftward a greater distance than traditional lipskins. For example, a traditional lipskin may extend about 5% of a total length of the nacelle 10, while the lipskin 18 described herein may have an outer wall 42 that extends aftward approximately 15% to 25% of the nacelle's length. This allows a longer length of a seamless section, such that a seam is not located at the most critical part for laminar flow. This means that a distance along the OML 32 between the apex 38 and the outer edge 28 may be greater than a distance along the OML 32 between the apex 38 and the inner edge 30. For example, the distance between the apex 38 and the outer edge 28 may be at least double the distance between the apex 38 and the inner edge 30. Alternatively, the inner wall 40 of the lipskin 18 may extend farther aftward too, but may alternatively have a standard-sized lipskin inner wall 40. Likewise, the outer wall 42 of the lipskin 18 may have a traditional length without departing from the scope of the invention, as in FIGS. 14-15.

The stiffeners 36 may be machined into the IML 34, as later described herein, and may include one or more spiral stiffeners and/or one or more circular stiffeners forming ridges or protrusions spaced apart from each other in a fore-to-aft direction within the lipskin 18. The circular or spiral stiffeners may have thickness and/or width variations designed to be thinner or narrower where stress levels are low and increase in height or thickness where higher loading is expected. A large number of smaller circumferential stiffeners may be used in some embodiments of the invention to create a more uniform stiffness distribution. This can limit surface waviness of the laminar flow surface, reducing the growth of flow disturbances that can cause premature transition to turbulent flow. For example, eight integral circumferential stiffeners may be formed on the IML 34, and may have a thickness of approximately 0.440 inches and a width of approximately 0.210 inches. However, other quantities of stiffeners 36 and other dimensions may be used without departing from the scope of the invention. The stiffeners 36 may be segmented and/or continuous, extending 360-degrees around the lipskin 18 along its IML 34. Adjacent end portions of the segmented stiffeners may also be coupled together using splice plates, fasteners, and/or other attachment devices or techniques, such as welded-on splice plates, in order to achieve the structural benefit of a continuous stiffener while also enjoying the forming benefit of a segmented stiffener, as later described herein. Additionally or alternatively, longitudinal stiffeners may be formed in the IML 34.

In some embodiments of the invention, as illustrated in FIG. 2, the IML 34 may also include an attachment flange 44 machined therein at a location where the bulkhead 20 attaches. Specifically, the first portion 24 of the bulkhead 20 may be mechanically attached to the attachment flange 44 of the IML 34 of the lipskin 18. This allows for elimination of fasteners extending through the OML 32 of the lipskin 18 at that location, thereby maintaining a smooth OML/laminar flow surface, as illustrated in FIG. 2. A plurality of mechanical fasteners may also be used to extend through the second portion 26 of the bulkhead 20 and the lipskin 18 as well as the second portion 26 of the bulkhead 20 and the inner cowl wall of the fan cowl 12, forming a splice between the inner cowl wall and the lipskin 18. The bulkhead 20 thus substantially extends between the inner wall 40 and the outer wall 42 of the lipskin 18.

Figure 4:
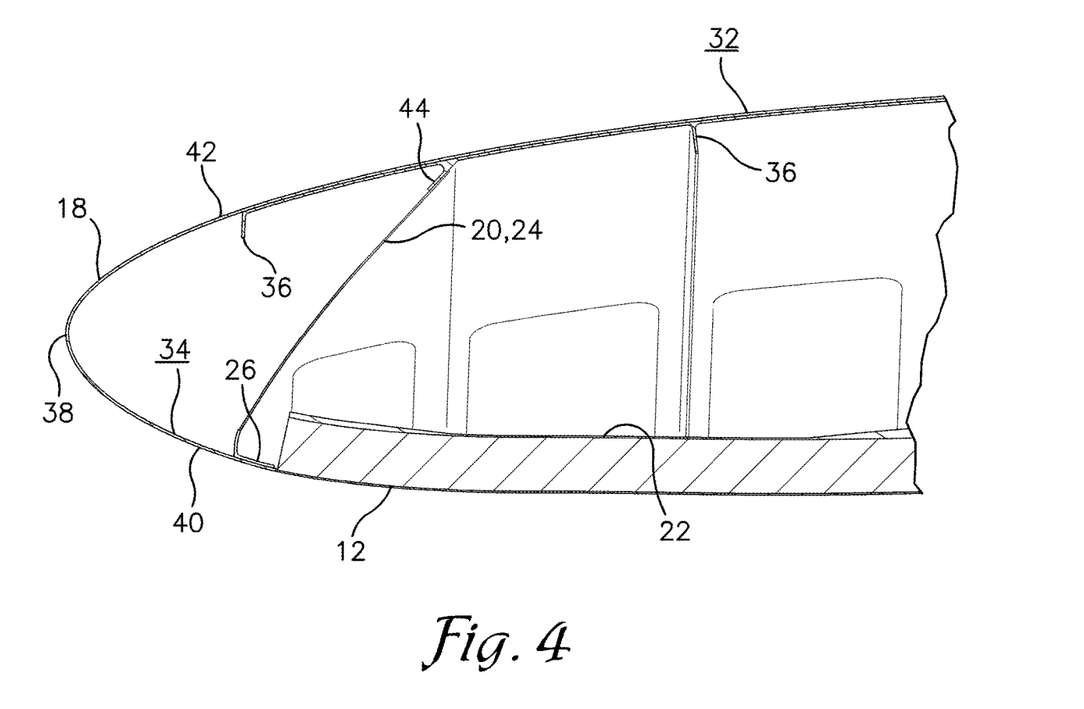
FIG. 4 is a fragmentary side cross-sectional view of an alternative embodiment of the lipskin and bulkhead, with an acutely-angled attachment flange.
Figure 5:
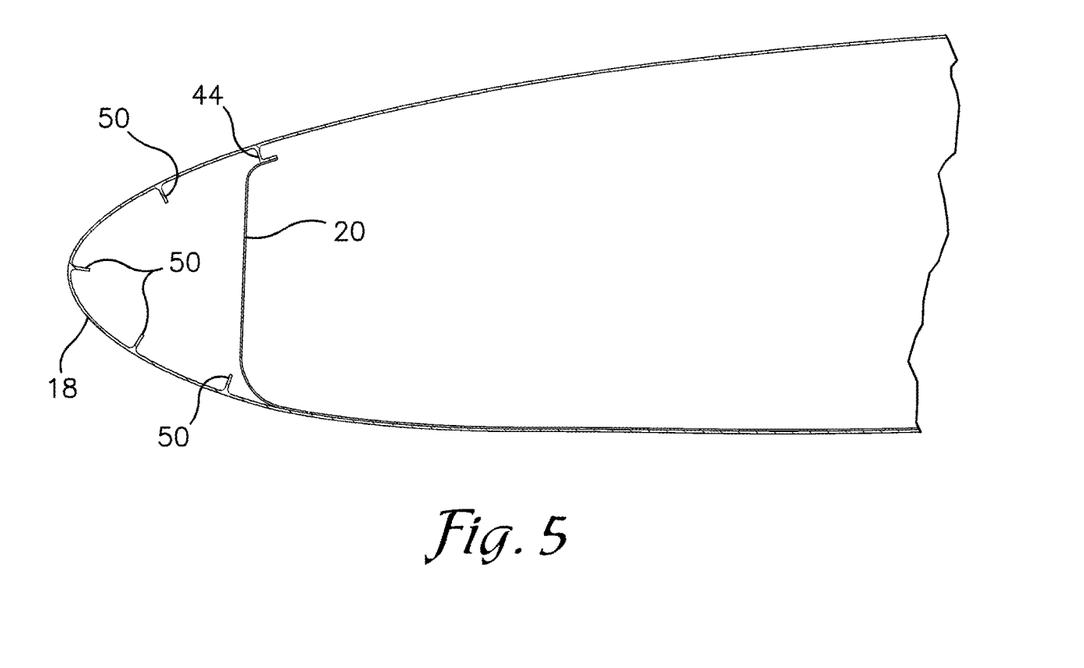
FIG. 5 is a fragmentary side cross-sectional view of another alternative embodiment of the lipskin and bulkhead, with an L-shaped attachment flange.

The attachment flange 44 may be a single protrusion extending substantially perpendicularly from the IML 34 of the lipskin 18 or angled in a forward and downward direction from the IML 34 of the outer wall 42 of the lipskin 18, as illustrated in FIG. 4. Additionally or alternatively, as illustrated in FIG. 5, the attachment flange 44 may have an L-shaped or U-shaped configuration, through which an attachment device or fastener may extend, attaching the bulkhead 20 to the attachment flange 44 without the fastener extending through the OML 32.

Figure 6:
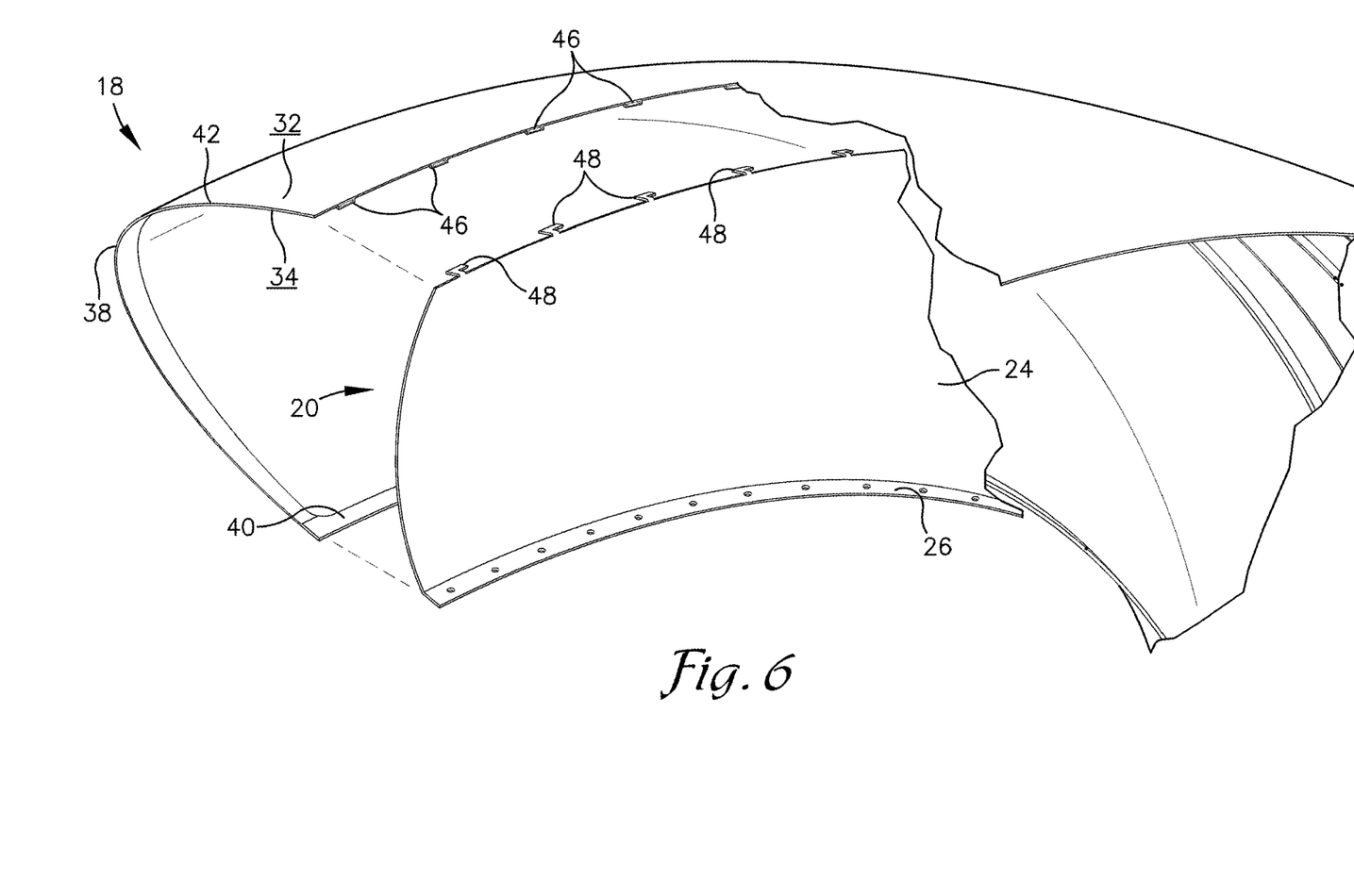
FIG. 6 is an exploded fragmentary view of an alternative embodiment of the lipskin having L-shaped attachment tabs and a bulkhead having L-shaped attachment tabs to engage therewith.

In some alternative embodiments of the invention, the attachment flange 44 may be replaced with attachment tabs 46, as illustrated in FIG. 6. The attachment tabs 46 may be L-shaped, comprising two protruding portions forming substantially 90-degree angles with each other. The first portion 24 of the bulkhead 20 may also have a plurality of attachment tabs 48 similarly shaped and extending from an outer edge of the first portion 24 of the bulkhead 20, as illustrated in FIG. 6. The attachment tabs 46 of the lipskin 18 may engage with or lock into place with attachment tabs 48 extending from the bulkhead 20. Specifically, the bulkhead 20 may be positioned within the lipskin 18 such that the bulkhead attachment tabs 48 circumferentially align with the attachment tabs 46 of the lipskin 18, and then the bulkhead 20 and/or the lipskin 18 may be twisted or rotated until the attachment tabs 46,48 of the lipskin 18 and the bulkhead 20 engage with each other. This substantially locks the bulkhead 20 into place within the lipskin 18 once mechanical attachments are added to join the bulkhead 20 attachment flange or second portion 26 to the inner wall 40 of the lipskin 18.

Figure 7:
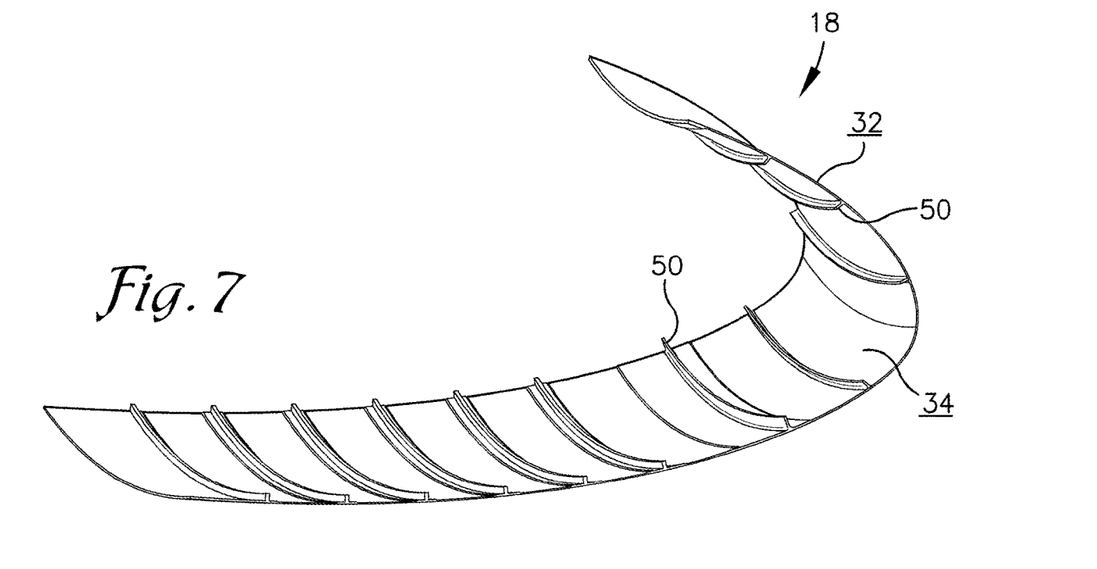
FIG. 7 is a fragmentary perspective view of an alternative embodiment of the lipskin, including a plurality of heat transfer fins.

In some embodiments of the invention, the lipskin 18 may further comprise heat transfer fins 50 and/or vortex generators extending inward from the IML 34 thereof, for increasing thermal conduction to enable more efficient anti-icing/de-icing. The heat transfer fins 50 and/or the vortex generators may be machined in the IML 34 in a segment forward of the stiffeners 36 and proximate to the apex 38, as illustrated in FIG. 7. This may allow surfaces of the lipskin 18 to extend closer to various heating elements and/or provide a greater surface area for contact with heated gas or air provided by hot air injection systems known in the art.

Forming and Post-Machining of Monolithic Lipskin

Figure 8:
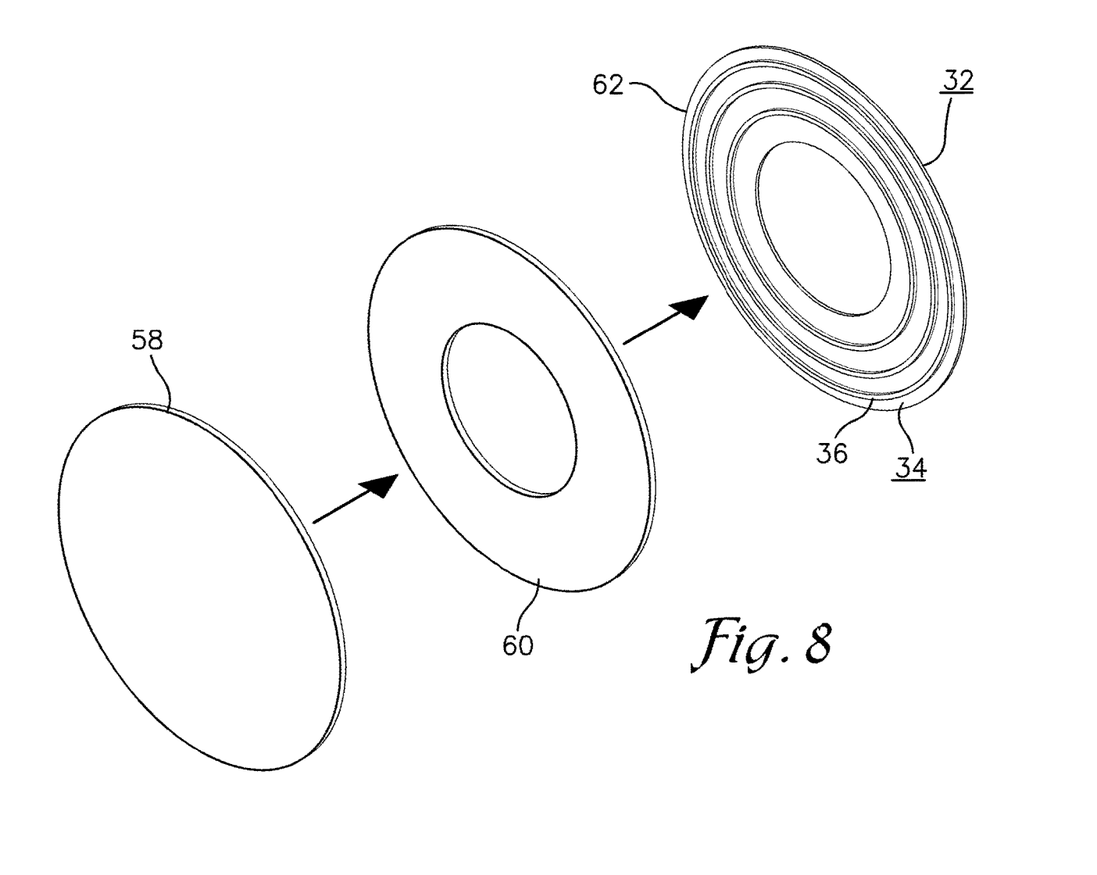
FIG. 8 is a schematic flow diagram illustrating the lipskin of FIG. 2 during different steps of fabrication of the lipskin.

As illustrated in FIG. 8, a method for fabricating the monolithic lipskin 18 may include forming a plate 58 into an annular shaped plate 60 and then spin-forming or explosive forming that plate 60 into a half-torus configuration (formed plate 62), such as an annular shape with a three-dimensionally curved surface having an apex between edges thereof, such as the apex 38 in FIG. 2. The method may then include heat-treating the formed plate 62, and machining or chemical milling the IML 34 and laminar flow surface or OML 32 to create desired monolithic profiles of the lipskin 18 out of the formed plate 62. The lipskin's profile on the IML 34 may include the circumferential or spiral stiffeners 36 for providing support for the lipskin laminar flow surface.

Figure 17:
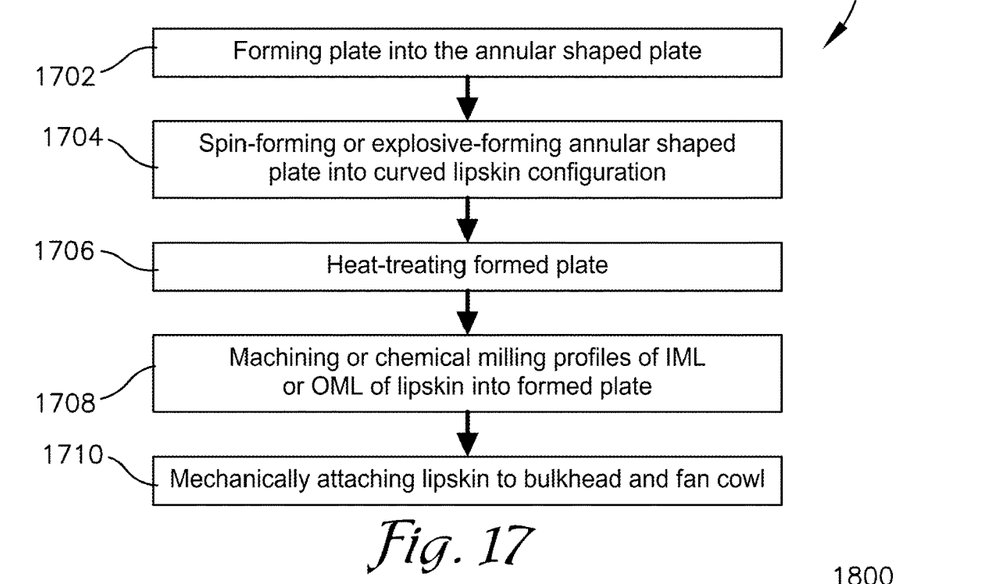
FIG. 17 is a flow chart illustrating a method of forming a monolithic lipskin in accordance with embodiments of the present invention.

Method steps for fabricating the nacelle lipskin 18 will now be described in more detail, in accordance with various embodiments of the present invention. The steps of the method 1700 may be performed in the order as shown in FIG. 17, or they may be performed in a different order. Furthermore, some steps may be performed concurrently as opposed to sequentially. In addition, some steps may not be performed.

Figure 9:
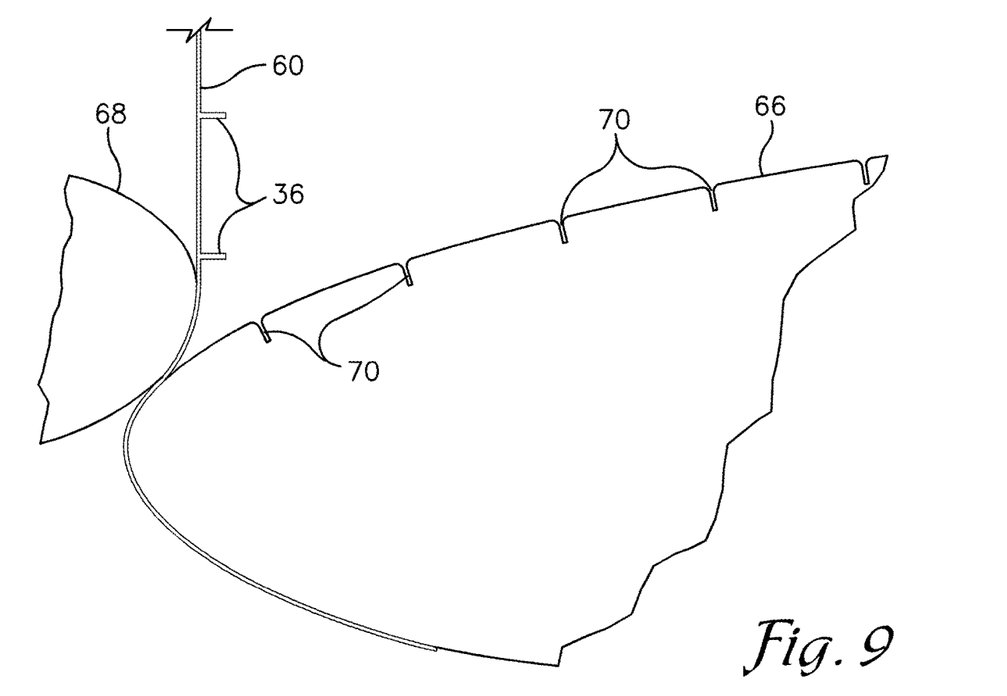
FIG. 9 is a fragmentary cross-sectional view of a mandrel and roller used to spin-form the lipskin of FIG. 2.
Figure 10:
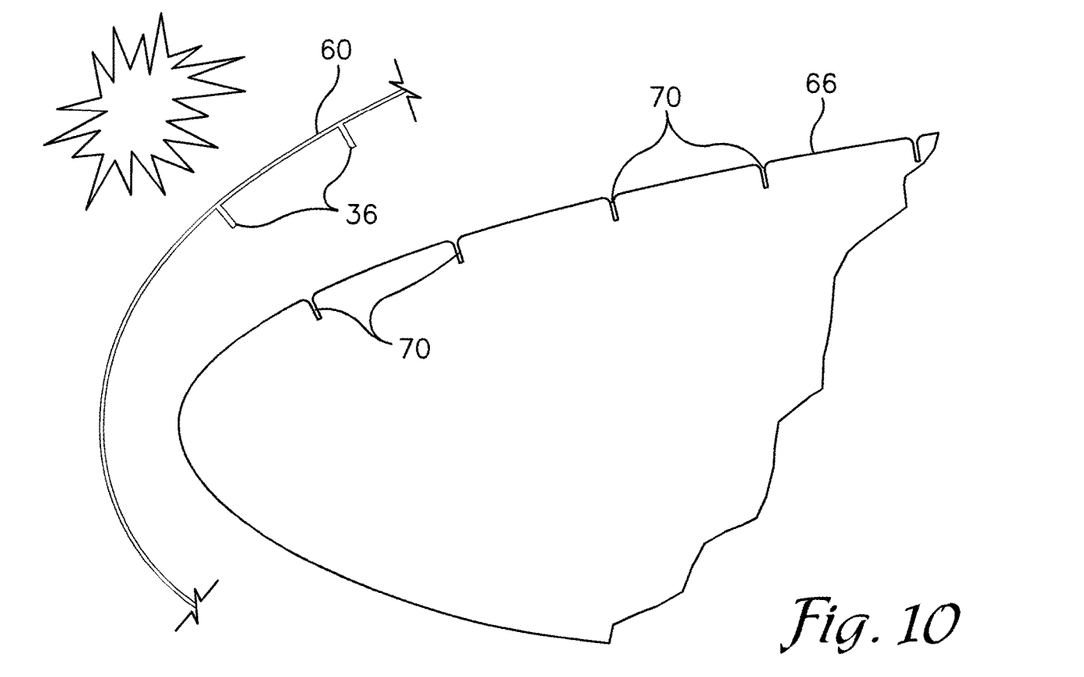
FIG. 10 is a schematic diagram of explosive-forming the lipskin of FIG. 2.

The method 1700 may include the steps of forming the plate 58 into the annular shaped plate 60, as depicted in block 1702, then spin-forming or explosive-forming the resulting annular shaped plate 60 into the lipskin configuration of the formed plate 62, as depicted in block 1704 and illustrated in FIGS. 8-10. As described above, the formed plate 62 of the lipskin 18 may be formed into a half-torus shape with the outer wall 42 extending a greater length than the inner wall 40.

The annular shaped plate 60 and/or the formed plate 62 may have a thickness at least as thick as a thickest protrusion, stiffener, attachment flange, or fin required along the IML 34 of the lipskin 18. However, the annular shaped plate 60 may be formed with a greater thickness, with excess material subsequently machined away without departing from the scope of the invention. The annular shaped plate 60 may be 5 to 15 times thicker than a minimum thickness of the finished lipskin 18 after machining. For example, the annular shaped plate 60 may have a thickness of approximately 0.5 inches-1.5 inches or between 0.75 inches and 1.25 inches. In one example embodiment, the plate described herein may have a thickness of approximately 1 inch.

The spin-forming of the annular-shaped plate 60 may be performed on a mandrel 66 to mold the plate 60 into a half-torus configuration or a similar three-dimensionally curved surface with an apex between edges thereof. As is known in the art, spin forming includes spinning a mandrel with a piece of formable material such as aluminum or other shapeable metals resting thereon. A roller 68 or other tool may press against one side of the formable material, pressing it toward the spinning mandrel 66, as illustrated in FIG. 9. The mandrel 66 may be a male tool having a small-radiused end about which the plate 60 is formed during spin-forming. Alternatively, explosive forming may be used, as illustrated in FIG. 10. Explosive forming may involve the mandrel 66 remaining stationary, and an explosive charge being detonated to one side of the plate 60, thereby rapidly forcing the plate 60 onto the mandrel 66 to form the desired lipskin shape.

Next, the method 1700 may include the steps of heat-treating the formed plate 62, as depicted in block 1706, using any methods or heat-treating techniques known in the art, and machining or chemical milling desired profiles for the IML 34 and the laminar flow surface or OML 32 of the lipskin 18 into the formed plate 62, as depicted in block 1708. This may include machining or chemical milling the circumferential or spiral stiffeners 36 for providing support for the lipskin laminar flow surface, as described above, as well as machining or chemical milling attachment flanges 44, landings, pad up sections, pockets, tabs 46, clevis, lug, or the like, as described herein. The stiffeners 36, for example, may extend approximately 0.5 inches to 1 inch from its surrounding surface of the IML 34. That is, material may be removed or machined away from the formed plate 62 to form features of the IML 34, intentionally leaving behind a greater thickness of the formed plate 62 in some areas, which may thus become the protrusions, stiffeners 36, or the like described herein. The machining may be performed on a CNC 5 axis machine or a CNC 5 axis turning lathe machine, as known in the art. However, other milling or machining tools and techniques may be used without departing from the scope of the invention. Additionally or alternatively, the step of machining or chemically-milling the lipskin 18 may be replaced with any method of selectively removing material from the lipskin 18 to form various protrusions, stiffeners, indentions, and the like.

The method 1700 may also include a step of mechanically attaching the lipskin 18 to the bulkhead 20 and the fan cowl 12, as depicted in block 1710. As noted above, the attachment flange 44 extending inward from the lipskin outer wall's IML 24 may be mechanically attached to the bulkhead 20 by any fasteners known in the art, and the second portion 26 or flange of the bulkhead 20 may be mechanically attached to both the lipskin inner wall 40 and the inner cowl wall of the fan cowl 12 by mechanical fasteners extending therethrough, as illustrated in FIG. 2.

Figures 12, 13:
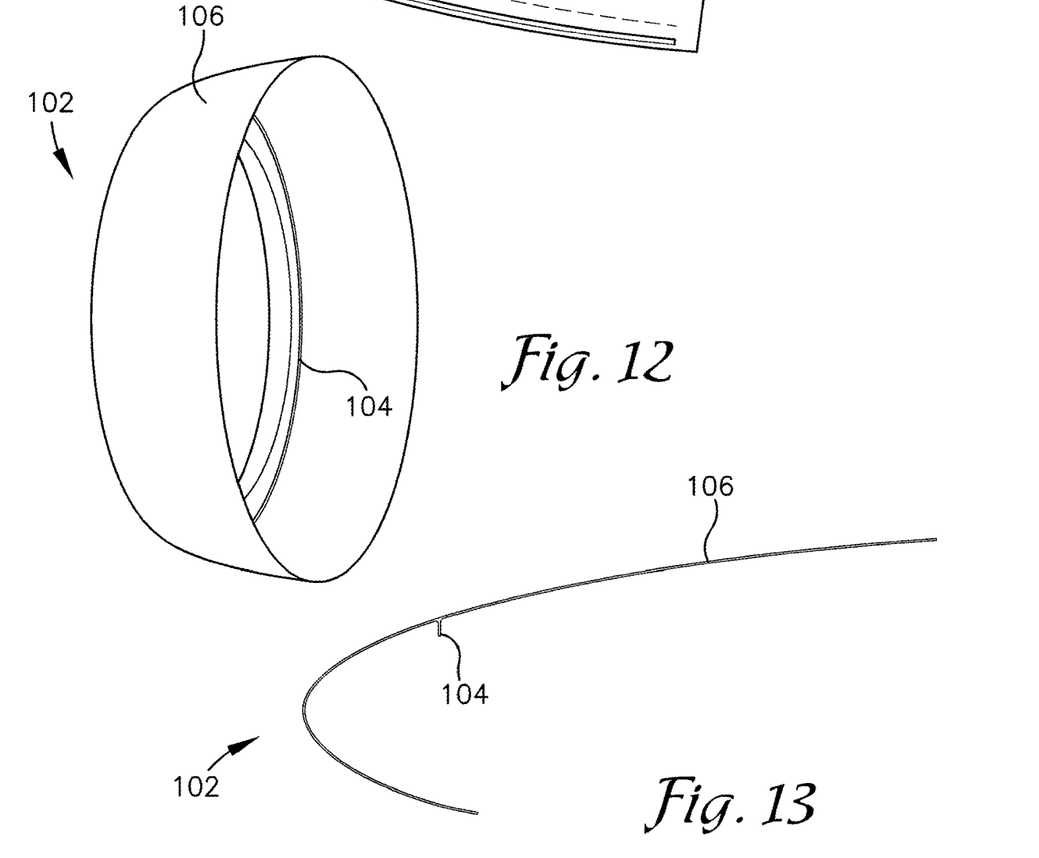
FIG. 12 is a perspective view of a lipskin constructed in accordance with an alternative embodiment of the present invention, including only an attachment flange.
FIG. 13 is a cross-sectional view of the lipskin of FIG. 12.
Figure 14:
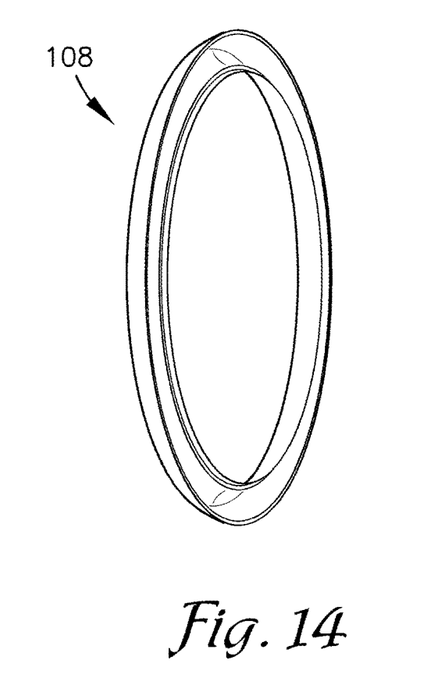
FIG. 14 is a perspective view of a lipskin constructed in accordance with an alternative embodiment of the present invention, including upper and lower attachment flanges or stiffeners extending therein.
Figure 15:
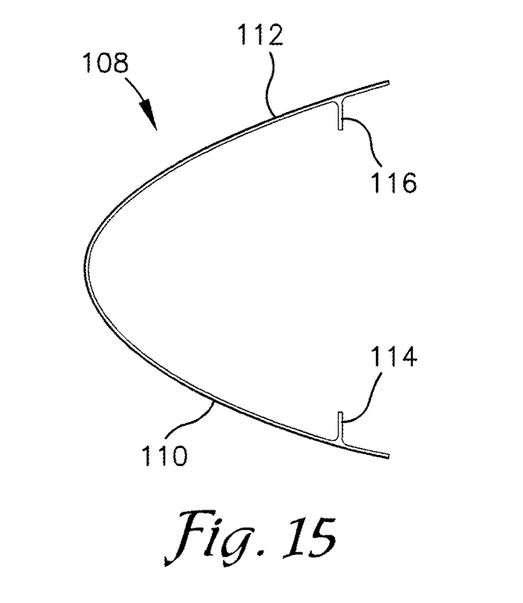
FIG. 15 is a cross-sectional view of the lipskin of FIG. 13.

Note that alternative lipskin configurations may be formed using the method 1700 described above without departing from the scope of the invention. For example as illustrated in FIGS. 12 and 13, a lipskin 102 with an integral attachment flange or stringer 104 and an elongated outer wall 106 may omit other integrally-formed stringers without departing from the scope of the invention. Alternatively, as illustrated in FIGS. 14 and 15, a lipskin 108 may be formed to have a standard size and shape, without elongating either an inner wall 110 or an outer wall 112 thereof. The lipskin 108 may also include an integrally-formed inner flange 114 and an integrally-formed outer flange 116 extending from an IML thereof for attachment to a bulkhead without departing from the scope of the method steps described herein.

Pre-Machining and Forming Monolithic Lipskin

In some embodiments of the invention, the monolithic lipskin described above may be formed in a similar fashion to method 1700, but may include the step of machining or chemical milling of the lipskin's IML and/or OML skin prior to spin-forming or explosive-forming of the formed plate 62 in its annular three-dimensionally curved configuration. For example, as illustrated in FIGS. 9-10, the stiffeners 36 may be pre-machined on a flat annular plate 60, and then spin-formed or explosive-formed onto a grooved mandrel 66, with a plurality of grooves 70 formed therein. The grooves 70 may align with the stiffeners 36 and may be sized and shaped so that the machined stiffeners 36 or other machined protrusions fit therein. This may reduce after forming machining and reduce mass and thickness of the material to be spin-formed. Pre-machining the plate 60 prior to spin forming or explosive forming may minimize more difficult machining efforts needed after the plate 60 is spin-formed or explosive-formed, and may simplify the spin-forming or explosive-forming process, since the thickness of the plate 60 being formed around the small radius of the male mandrel 66 would be smaller after being pre-machined as described herein.

The stiffeners 36 may be formed in continuous circle configurations on the flat annular plate 60, but may additionally or alternatively be formed in segments to avoid, reduce, or eliminate subsequent folding or buckling of the stiffeners 36 during spin forming. Specifically, segmented stiffeners would be one way to avoid/reduce/eliminate the buckling. The spacing and size of gaps between segments or the lengths of the segments could be determined with finite element analysis or finite element modeling. The gap resulting from segmentation could then be stiffened with a narrow plate attached on the either side of the gap with fastener holes in the stiffeners 36. Adjacent end portions of the segmented stiffeners may also be coupled together using splice plates, fasteners, or the like to achieve the structural benefit of a continuous stiffener while also enjoying the forming benefit of a segmented stiffener, as described above.

Figure 11:
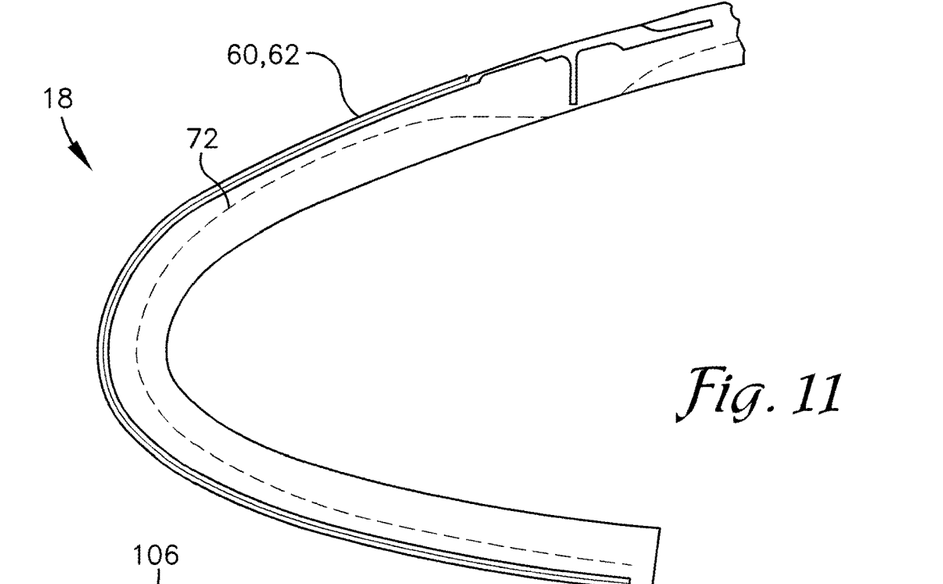
FIG. 11 is a fragmentary cross-sectional view of an alternative embodiment of the lipskin in which a pre-machined cut is made to assist in spin-forming or explosive forming thereof.

Additionally or alternatively, some of the stiffeners 36 or protrusions may be machined into the formed plate 62 after spin-forming or explosive forming, while others of the stiffeners 36 or protrusions are machined into the plate 60 prior to spin-forming or explosive forming without departing from the scope of the invention. In some embodiments of the invention, the pre-machining may merely include cutting or machining off material from the annular shaped plate 60 by an amount sufficient to form the plate 60 around the mandrel 66, as illustrated in FIG. 11 (see cut line 72).

However, additional machining may still be required after spin forming or explosive forming to complete a desired profile for the IML 34.

Method of Forming/Assembling Multi-Segment Lipskin

Figure 16:
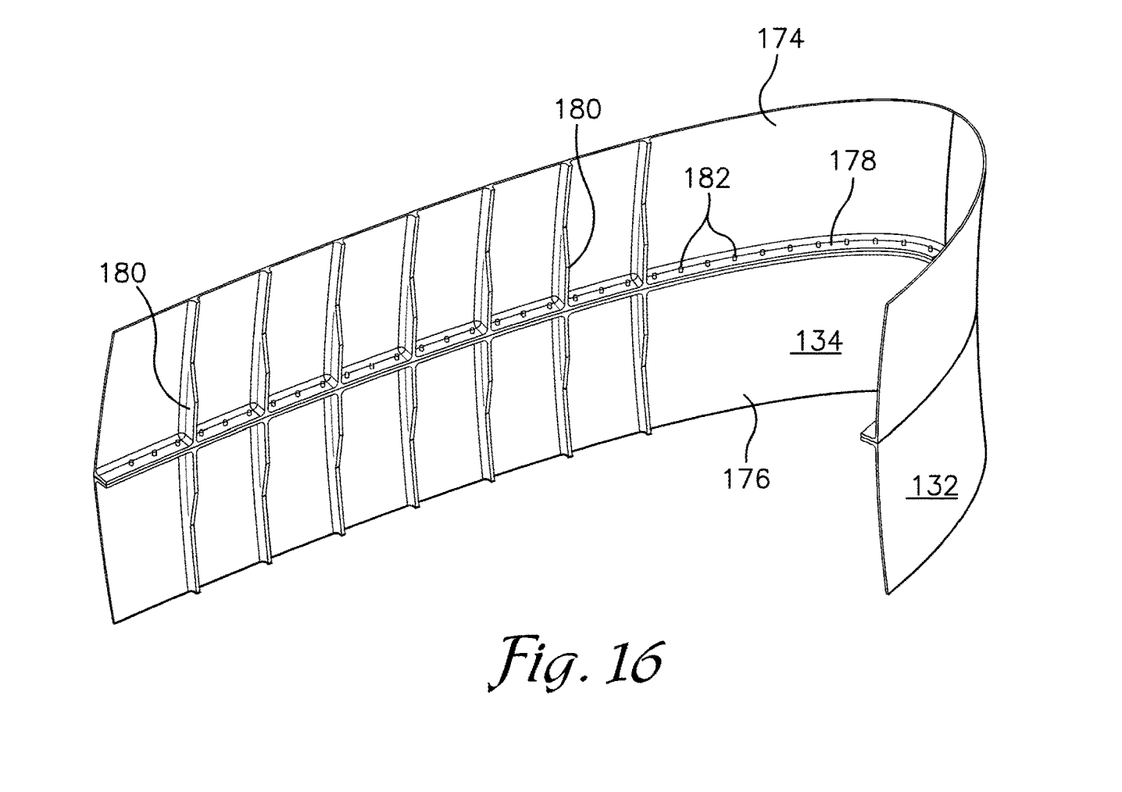
FIG. 16 is a fragmentary perspective view of a lipskin constructed in accordance with embodiments of the present invention, including joint flanges joining an upper and a lower half of the lipskin.

In some alternative embodiments of the invention, a multi-segment lipskin 118 may be formed of multiple segments mechanically fastened to each other along a joint, as illustrated in the fragmentary view of FIG. 16. For example, the multi-segment lipskin 118 may include an upper half 174 and a lower half 176, as opposed to being formed as a single, 360-degree part. The lipskin's halves 174,176 may each include an outer surface or OML 132 and an inner surface or IML 134, as described above. The upper and lower halves 174,176 may also include integrally formed stiffeners 136 or other protrusions or cavities in the IML 134, similar to the protrusions described for the IML 34 above.

Figure 18:
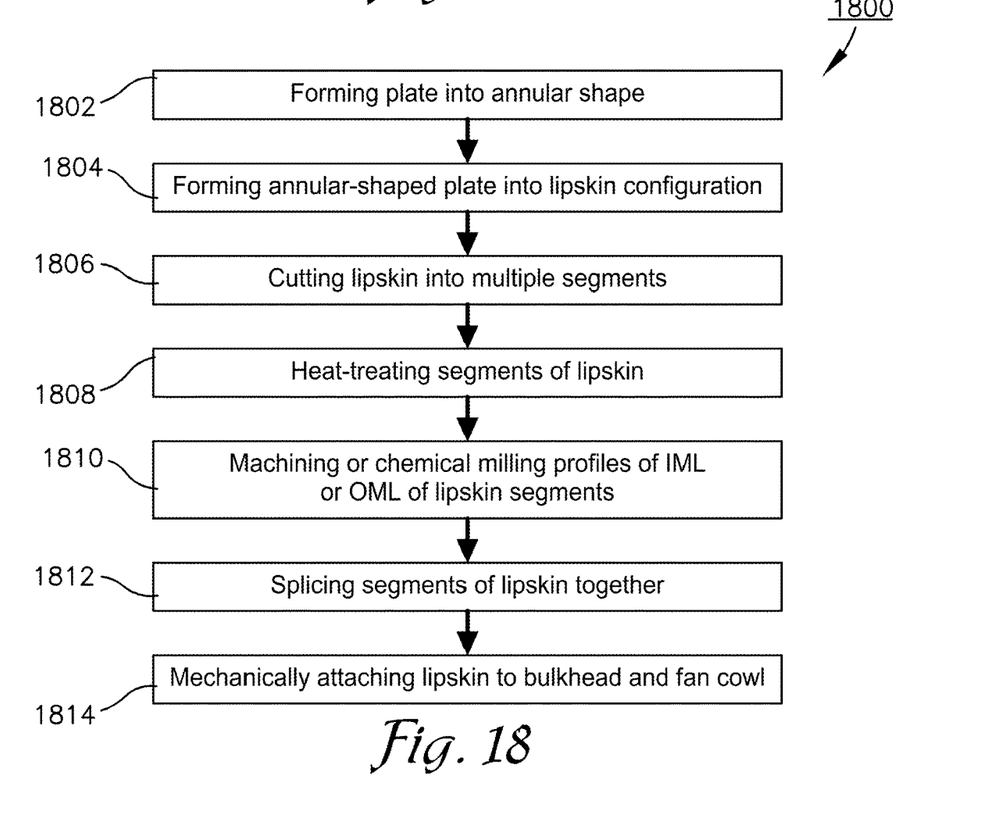
FIG. 18 is a flow chart illustrating a method of forming a multi-segment lipskin in accordance with embodiments of the present invention.

Method steps for fabricating the nacelle multi-segment lipskin 118 will now be described in more detail, in accordance with various embodiments of the present invention. The steps of the method 1800 may be performed in the order as shown in FIG. 18, or they may be performed in a different order. Furthermore, some steps may be performed concurrently as opposed to sequentially. In addition, some steps may not be performed.

As illustrated in FIG. 18, a method 1800 of forming the multi-segment lipskin 118 as described above may include the steps of forming a plate into an annular shape, as depicted in block 1802, then forming the resulting annular-shaped plate into a lipskin configuration, as depicted in block 1804, such as a half-torus-shaped part. The plate formed into the annular shape may have the same thickness characteristics as in the method 1700 described above for the monolithic lipskin 18, and may be spin-formed or explosive-formed in the same manner as the monolithic lipskin described above. Alternatively, other types of monolithic forming may be performed without departing from the scope of method 1800.

The method 1800 may then include a step of cutting the spin-formed plate into multiple segments, as depicted in block 1806, such as the upper and lower halves 174,176 of the multi-segment lipskin 118. This step may allow for easier transport of separate components and/or easier repair or replacement of one segment instead of an entire lipskin, when necessary. Other benefits not described herein may also exist for dividing the spin-formed plate into multiple segments.

Next, the method 1800 may include the steps of heat-treating the segments of the spin-formed plate, as depicted in block 1808, using any methods or heat-treating techniques known in the art, and machining or chemical milling the IML 134 and the laminar flow surface or OML 132 of the lipskin segments or halves 174,176, as depicted in block 1810. This may include machining or chemical milling segments of circumferential or spiral stiffeners 136 for providing support for the lipskin laminar flow surface, as described above, as well as machining or chemical milling attachment flanges, joint flanges, landings, pad up sections, pockets, tabs, clevis, lug, or the like, as described herein, similar to the protrusions described above for the lipskin 18. The stiffeners 136 may have any of the dimensions described above, but machining thereof may be performed on each segment of the multi-segment lipskin 118 individually. Note that methods other than machining or chemical milling may be used to form profiles or features into the lipskin segments without departing from the scope of the invention.

The method 1800 may further include a step of splicing the upper and lower halves 174,176 of the lipskin 118 together, as depicted in block 1812. For example, joint flanges 178 extending from the IML 134 at various splice locations may be used for mechanical attachment at a splice location where upper and lower halves 174,176 of the lipskin 118 are joined together. Note that the stiffeners 136 may also be reinforced with additional thickness and/or width support features 180 at locations proximate to these splice locations, as illustrated in FIG. 16. The joint flanges 178 may extend inward from the IMLs of the upper and lower halves 174,176 of the multi-segment lipskin 118, and fasteners may be placed in aligned holes 182 formed through the joint flanges 178, such that the fasteners are completely internal of the lipskin OML 132. This configuration also laterally stiffens the lipskin structure, preventing undesirable warping or bending. The method 1800 may also include a step of mechanically attaching the segments or halves 174,176 of the lipskin 118 to a bulkhead and a fan cowl, as depicted in block 1814, in a similar manner to previous embodiments described above.

Advantageously, the invention and methods described herein eliminate hundreds or even thousands of countersunk drill holes, fasteners, rivets, and splice plates previously required to join stiffeners to the lipskin and/or to join the upper and lower halves of the lipskin together. This may result in reduced cost, reduced assembly time, reduced weight, and a smoother more aerodynamic OML surface of the lipskin on the nacelle. This invention may also advantageously reduce or eliminate a number of bonding, welds, and inspection issues associated with other lipskin manufacturing techniques. Furthermore, by extending the lipskin further aftward than prior art lipskin designs, a seam between the lipskin and the fan cowl is no longer located at the most critical part for laminar flow. Such features will thus reduce turbulence and fulfill various requirements for laminar flow per engineering specifications.

Although the invention has been described with reference to the embodiments illustrated in the attached drawing figures, it is noted that equivalents may be employed and substitutions made herein without departing from the scope of the invention as recited in the claims. For example, although circumferential and spiral stringers are described herein, other shapes, angles, and configurations of stringers may be machined into the IML without departing from the scope of the invention. Furthermore, the spin-forming of a part onto a grooved mandrel, with the grooves thereof shaped and sized to accommodate for protrusions extending from a pre-machined plate may be used to form other aircraft components or other spin-formed parts besides the lipskin described herein. The spin-forming techniques described herein may also be used for the manufacturing of thrust reverser components, primary exhaust nozzles, engine center bodies, aircraft domes, metallic fuselage skins with stringers or frames, or any circumferential members, especially those with compound curvatures.

Having thus described various embodiments of the invention, what is claimed as new and desired to be protected by Letters Patent includes the following:

1. A method of forming a monolithic lipskin for an aircraft nacelle, the method comprising the steps of:
   forming an annular plate of metal onto a mandrel, the annular plate having inner and outer edges, an inner mold line (IML) surface, and an outer mold line (OML) surface opposite the IML surface, wherein the forming deforms the annular plate into an annular three-dimensionally curved surface having an apex between the inner and outer edges; and selectively removing material from the IML surface, forming a plurality of protrusions for attachment or structural stiffening of the monolithic lipskin, wherein the step of selectively removing material occurs prior to the step of forming, and the mandrel includes a plurality of grooves or indentions formed therein, the grooves or indentions having a size, configuration, and spacing corresponding to the plurality of protrusions, such that the plurality of protrusions nest within the grooves or indentions when the annular plate is formed onto the mandrel.

2. The method of claim 1, wherein the step of forming includes spin-forming or explosive forming the annular plate onto the mandrel.

3. The method of claim 1, wherein the protrusions include one or more circumferential stiffeners or spiral stiffeners protruding from the IML, wherein the stiffeners are continuous or segmented into a plurality of stiffener segments forming the circumferential stiffeners or the spiral stiffeners.

4. The method of claim 3, wherein the protrusions include one or more heat transfer fins machined in the IML surface forward of the stiffeners and proximate to the apex.

5. The method of claim 1, wherein the protrusions include at least one attachment flange configured for attachment to a bulkhead of an aircraft nacelle.

6. The method of claim 1, wherein the thickness of the annular plate is greater than 0.5 inches.

7. The method of claim 1, wherein the thickness of the annular plate is at least 1 inch.

8. The method of claim 1, wherein the annular plate is formed such that a distance along the OML surface between the apex and the outer edge is at least double a distance along the OML surface between the apex and the inner edge.

9. The method of claim 1, wherein the protrusions are sized and oriented in accordance with a finite element analysis model of the aircraft nacelle.

10. A method of forming a monolithic lipskin for an aircraft nacelle, the method comprising the steps of:
forming an annular plate of metal onto a mandrel, the annular plate having inner and outer edges, an inner mold line (IML) surface, and an outer mold line (OML) surface opposite the IML surface, wherein the forming deforms the annular plate into an annular three-dimensionally curved surface having an apex between the inner and outer edges;
selectively removing material from the IML surface, forming a plurality of protrusions for attachment or structural stiffening of the monolithic lipskin; and
dividing the annular plate into two or more segments after the step of forming, wherein the protrusions include joint flanges formed at edges of the segments of the annular plate during the step of selectively removing material, wherein the joint flanges have holes formed therethrough, the method further comprising a step of mechanically attaching the segments of the annular plate back together by inserting mechanical fasteners through the holes in the joint flanges.

11. A method of forming an aircraft nacelle with a monolithic lipskin, the method comprising the steps of:
spin-forming an annular plate of metal onto a spinning mandrel, the annular plate having inner and outer edges, an inner mold line (IML) surface, and an outer mold line (OML) surface opposite the IML surface, wherein the spin-forming deforms the annular plate into an annular three-dimensionally curved surface having an apex between the inner and outer edges;
machining or chemically milling the IML surface into a plurality of protrusions for attachment or structural stiffening of the monolithic lipskin, wherein the protrusions include a plurality of stiffeners and an attachment flange, wherein the stiffeners have a circular or a spiral configuration and are sized and oriented in accordance with a finite element analysis model of the aircraft nacelle, wherein the stiffeners are continuous or segmented into a plurality of stiffener segments forming the circumferential or spiral configuration, wherein the machining or chemical milling step occurs prior to the step of spin-forming, and the spinning mandrel includes a plurality of grooves or indentions formed therein, the grooves or indentions having a size, configuration, and spacing corresponding to the plurality of protrusions, such that the plurality of protrusions nest within the grooves or indentions when the annular plate is spin-formed onto the spinning mandrel;
mechanically attaching a bulkhead to the attachment flange proximate an outer edge of the bulkhead;
mechanically attaching a flange of the bulkhead to the monolithic lipskin at the inner edge of the annular plate, wherein the flange is located at an inner edge of the bulkhead, opposite the outer edge of the bulkhead; and
mechanically attaching the flange of the bulkhead to a fan cowl having a front edge abutting the inner edge of the annular plate.

12. The method of claim 11, wherein the protrusions include one or more heat transfer fins or vortex generators machined in the IML surface forward of the stiffeners and proximate to the apex.

13. The method of claim 11, wherein the thickness of the annular plate is in a range of 0.5 inches to 1.5 inches.

14. The method of claim 11, wherein the annular plate is spin-formed such that a distance along the OML surface between the apex and the outer edge is in a range of 15 percent to 25 percent a total length of the aircraft nacelle.

15. The method of claim 11, further comprising heat-treating the annular plate before or after at least one of the step of spin-forming and the step of machining or chemically milling.

16. A method of forming an aircraft nacelle with a monolithic lipskin, the method comprising the steps of:
spin-forming an annular plate of metal onto a spinning mandrel, the annular plate having inner and outer edges, an inner mold line (IML) surface, and an outer mold line (OML) surface opposite the IML surface, wherein the spin-forming deforms the annular plate into an annular three-dimensionally curved surface having an apex between the inner and outer edges;
machining or chemically milling the IML surface into a plurality of protrusions for attachment or structural stiffening of the monolithic lipskin, wherein the protrusions include a plurality of stiffeners and an attachment flange, wherein the stiffeners have a circular or a spiral configuration and are sized and oriented in accordance with a finite element analysis model of the aircraft nacelle, wherein the stiffeners are continuous or segmented into a plurality of stiffener segments forming the circumferential or spiral configuration;
mechanically attaching a bulkhead to the attachment flange proximate an outer edge of the bulkhead;
mechanically attaching a flange of the bulkhead to the monolithic lipskin at the inner edge of the annular plate, wherein the flange is located at an inner edge of the bulkhead, opposite the outer edge of the bulkhead;

mechanically attaching the flange of the bulkhead to a fan cowl having a front edge abutting the inner edge of the annular plate; and dividing the annular plate into two or more segments after the step of spin-forming, wherein the protrusions include joint flanges formed at edges of the segments of the spin-formed annular plate, wherein the joint flanges have holes formed therethrough, the method further comprising a step of mechanically attaching the segments of the spin-formed annular plate back together by inserting mechanical fasteners through the holes in the joint flanges.

\* \* \* \* \*